(12) United States Patent
Domanovitz et al.

(10) Patent No.: US 10,587,351 B2
(45) Date of Patent: Mar. 10, 2020

(54) METHOD FOR SETTING ANALOG AMPLIFIER GAINS USING SHOWTIME SIGNALS

(71) Applicant: ACTELIS NETWORKS (ISRAEL) LTD., Petach Tikva (IL)

(72) Inventors: Elad Domanovitz, Mazkeret Batya (IL); Sarit Uval, Givataim (IL); Oded Sinai, Kfar Haoranim (IL)

(73) Assignee: ACTELIS NETWORKS (ISRAEL) LTD., Petach Tikva (IL)

( * ) Notice: Subject to any disclaimer, the term of this patent is extended or adjusted under 35 U.S.C. 154(b) by 0 days.

(21) Appl. No.: 16/010,466

(22) Filed: Jun. 17, 2018

(65) Prior Publication Data

US 2019/0007148 A1  Jan. 3, 2019

Related U.S. Application Data

(60) Provisional application No. 62/526,379, filed on Jun. 29, 2017.

(51) Int. Cl.
*H04B 17/318* (2015.01)
*H04L 12/28* (2006.01)

(52) U.S. Cl.
CPC ....... *H04B 17/318* (2015.01); *H04L 12/2878* (2013.01)

(58) Field of Classification Search
CPC ................ H04B 17/318; H04L 12/2878

USPC ........................................... 375/224
See application file for complete search history.

(56) References Cited

U.S. PATENT DOCUMENTS

| | | | |
|---|---|---|---|
| 2003/0016797 A1* | 1/2003 | Zakrzewski | H04L 47/10 379/93.32 |
| 2006/0098804 A1* | 5/2006 | Larzabal | H04B 3/36 379/346 |
| 2007/0280339 A1* | 12/2007 | Oksman | H04B 1/10 375/222 |
| 2010/0067396 A1* | 3/2010 | Cui | H04L 1/0026 370/252 |

* cited by examiner

*Primary Examiner* — Michael R Neff
(74) *Attorney, Agent, or Firm* — Pearl Cohen Zedek Latzer Baratz LLP

(57) ABSTRACT

A method for estimating downstream gain and upstream gain of an amplifier at an intermediate location in a twisted pair line between a DSL Access Multiplexer (DSLAM) and a customer premises equipment (CPE) for high data rate broadband operation. The method includes: an offline calibration process for obtaining offline tables, and an estimation process including: setting the downstream gain and the upstream gain to a set of predefined gains in the twisted pair line when activated and getting an indication if the line is in ShowTime. In case the line is in ShowTime, the estimation process further measures the downstream/upstream signal level, estimates the distance from the amplifier to the CPE and distance from the amplifier to the to the CPE and the distance from the amplifier to the DSLAM, and obtains the upstream/downstream gains.

9 Claims, 7 Drawing Sheets

| VTU-O | ITU-T G994.1 Handshake (12.3.2) | Channel discovery (12.3.3) | Training (12.3.4) | Channel Analysis and exchange (12.3.5) |

| VTU-R | ITU-T G994.1 Handshake (12.3.2) | Channel discovery (12.3.3) | Training (12.3.4) | Channel Analysis and exchange (12.3.5) |

Figure 1

METHOD FOR SETTING ANALOG AMPLIFIER GAINS USING SHOWTIME SIGNALS

BACKGROUND OF THE INVENTION

This invention relates generally to Digital Subscriber Line (DSL) technology, and more particularly to a method for gain estimation using ShowTime signals of analog amplifier deployed in the middle of the line and used to increase throughput of the DSL.

Discrete Multitone (DMT) modems has initialization process, which is composed of the following phases:
Handshake (HS)
Channel discovery
Training
Channel analysis and exchange When the initialization sequence is completed, data transmission (ShowTime) is initiated. An example of these steps is depicted in FIG. 1 (see ITU G.993.2 standard, figure 12-5).

Analog amplification can be used to increase the signal power of DSL to enable greater reach (coverage) and bandwidth. Analog amplifier magnifies the signal without terminating it. FIG. 2 is a schematic diagram presenting an analog amplifier along the telephone line, which connects between DSL Access Multiplexer (DSLAM) 10 and a Customer Premises Equipment (CPE) 12. D1 is the distance from the DSLAM 10 to the amplifier 14, and D2 is the distance from the amplifier 14 to the CPE 12.

As disclosed in U.S. Pat. No. 7,587,042, in order to be able to put the amplifier in a variety of locations along the line, the amplifier must have a configurable gain.

Using a wrong gain might result with line failing to activate or with non-optimal performance, either because the gain is too low, thus the signal arriving at the receiver is too weak, or because the gain is too high, thus the amplifier is saturated, and the signal is distorted.

U.S. Pat. No. 7,587,042 discloses a method for gain estimation based on the HS tones. This method suffers from several drawbacks, since the gain is not estimated on the actual signals that are transmitted over the line. For example:
The HS standard (ITU g.994.1) defines the maximal transmission level allowed during HS signaling. Some DSLAM/CPE transmit less than the maximal definition, resulting in an estimation error.
Some DSLAM/CPE transmit higher that the maximal allowed value (violating the standard). While this violation does not affect the normal activation of the modem, it results in an estimation error.

SUMMARY OF THE INVENTION

Some embodiments of the present invention provide a method for estimating downstream gain and upstream gain of an amplifier at an intermediate location in a twisted pair line between a DSL Access Multiplexer and a customer premises equipment for high data rate broadband operation. The method includes an offline calibration process for obtaining offline tables, and an estimation process including: setting the downlink gain and upstream gain to a set of predefined gains in which the line may be activated and getting an indication if the line is in showtime. In case the line is in showtime, the estimation process further measures the downstream/upstream signal level, estimates the distance from the amplifier to the customer premises equipment and the distance from the amplifier to the DSL Access Multiplexer, and obtains the upstream/downstream gains.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 is a schematic diagram of the initialization procedure based on the ITU standard G.993.2, dated January 2015.

Figure 2:
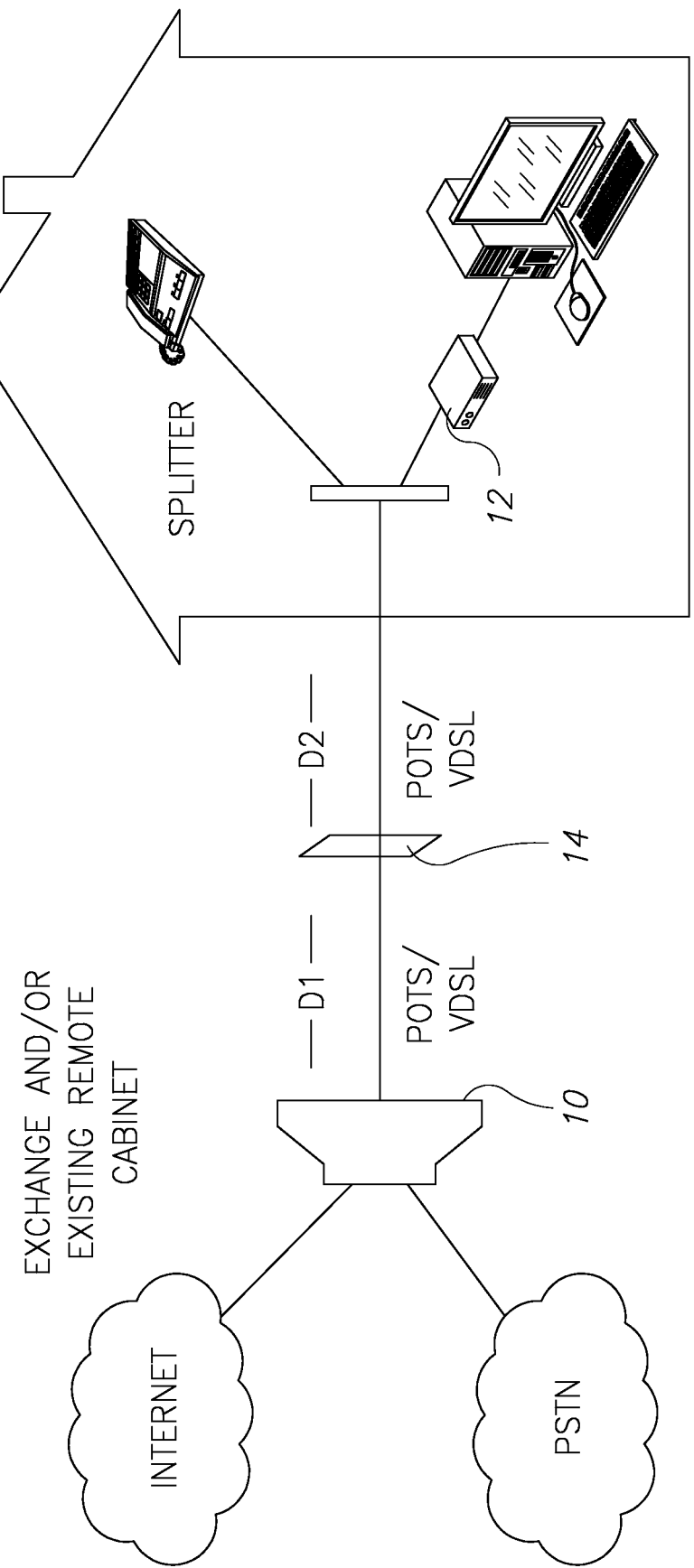
FIG. 2 is a schematic diagram of a DSL system, with an analog amplifier.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "ShowTime", as known in the domain of "Very high speed digital subscriber line" (VDSL), refers to the state of either the VDSL Transmitting Unit-at the Remote site (VTU-R) or VDSL Transmitting Unit-at the central office (VTU-O), that is reached after the initialization procedure has been completed in which bearer channel data are transmitted. (See ITU G.993.2 standard).

The term "steady signal level" is used to determine that the DS/US signal is equivalent to the signal level during showtime.

The disclosed method for gain estimation is using Showtime signals.

Figure 3:
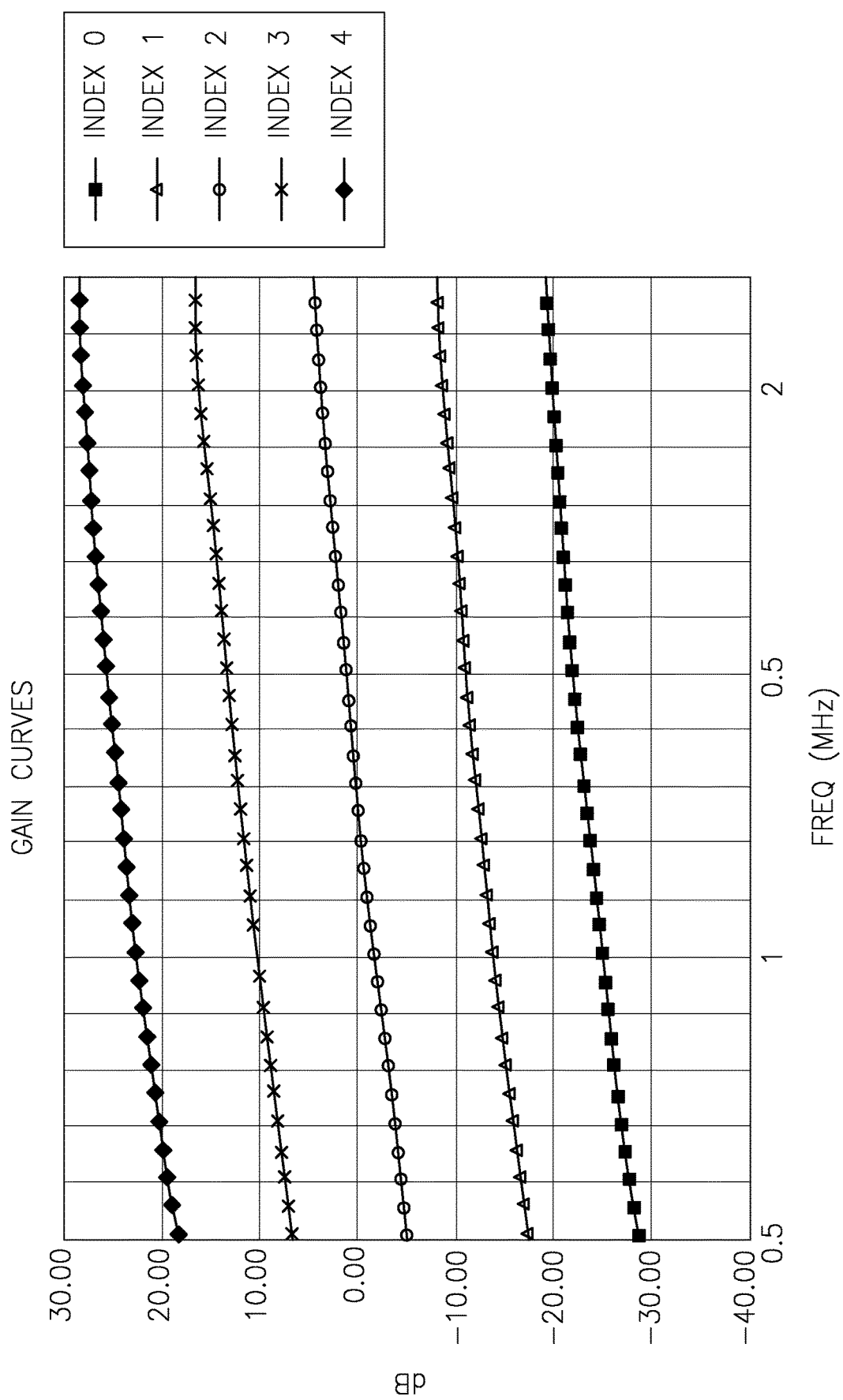
FIG. 3 presents an example of a graph of amplifier gain curves, for downstream (DS) gain as a function of the frequency.

FIG. 3 presents an example of a graph of amplifier gain curves, for downstream (DS) gain as a function of the frequency.

Figure 4:
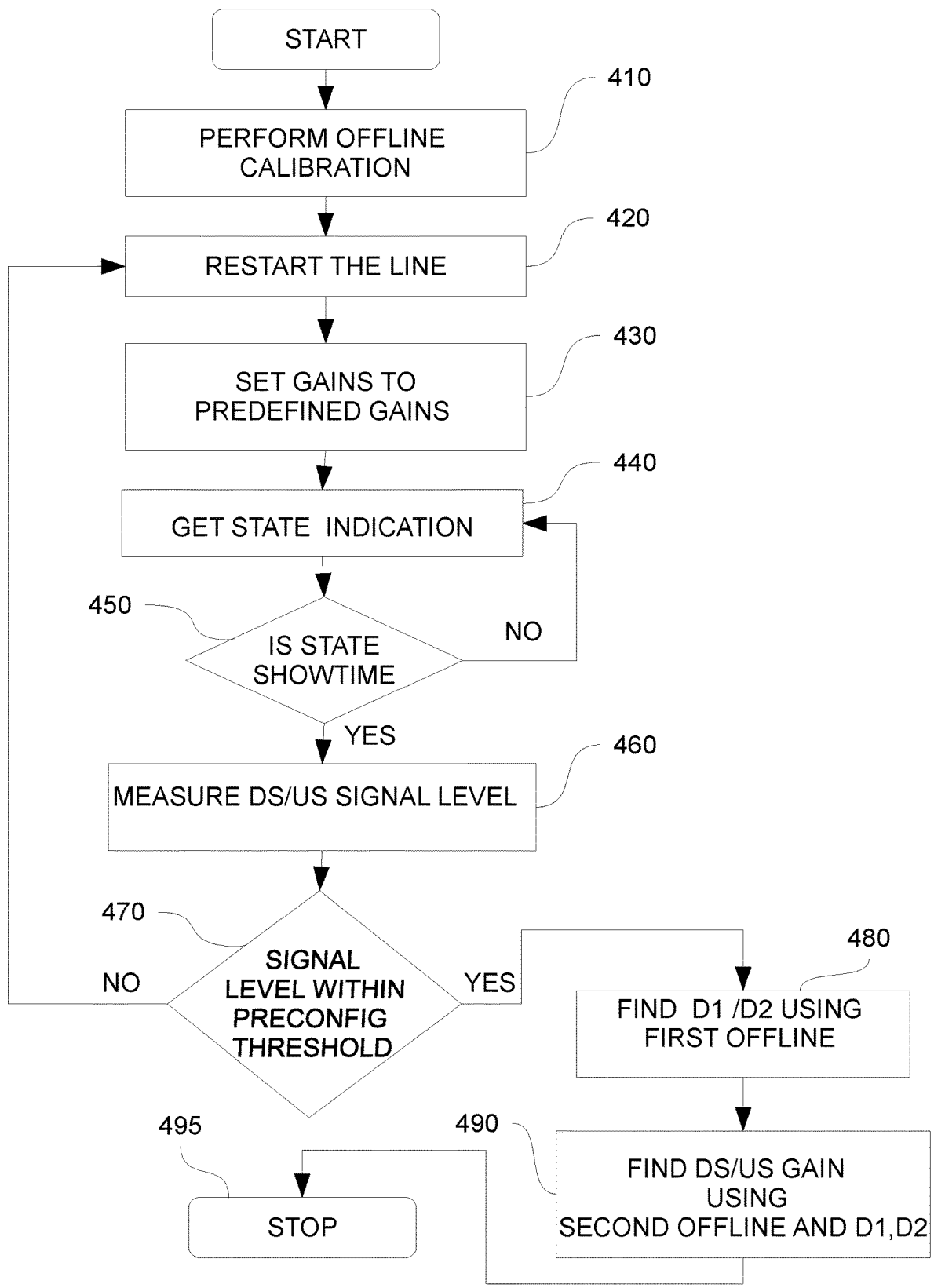
FIG. 4 is a block diagram of an embodiment of the gain estimation.

FIG. 4 is a block diagram of an embodiment of gain estimation process of the downstream (DS) gain estimation and upstream (US) gain estimation. A calibration stage 410 may be performed before running the estimation process. In the calibration stage, two tables may be prepared:

A first offline table—for each predefined set of gains, one gain for DS gain and another one for US gain (see for example, DS gain sets as shown in FIG. 3), may convert signal level reading to associated distance. An example of such a table is in Table 1, which used to convert DS signal level reading to associated distance D1). Similar offline tables may be used to convert US signal level to associated distance D2.

A second offline table—for each estimated distance pair (D1, D2) may set the proper gain based on amplifier limitations, spectral limitations or any other required limitations. An example of such a table is in Table 2, which may be used to obtain the DS gain to be set as a function of D1, D2 Similar offline tables may be used to obtain US gain to be set as a function of D1, D2.

TABLE 1

Example for conversion of DS signal level readings to associated distance D1

| D1 | Signal Level | | |
|---|---|---|---|
| (Length (kft) | 1st set of gains | 2nd set of gains | 3rd set of gains |
| 0 | 1745 | NA | NA |
| 0.25 | 1429 | NA | NA |
| 0.5 | 1171 | NA | NA |
| 0.75 | 959 | NA | NA |
| 1 | 786 | NA | NA |
| 1.25 | 644 | NA | NA |
| 1.5 | 527 | NA | NA |
| 1.75 | 432 | NA | NA |
| 2 | 354 | NA | NA |
| 2.25 | 290 | 1141 | NA |
| 2.5 | 237 | 937 | NA |
| 2.75 | 194 | 769 | NA |
| 3 | 159 | 632 | NA |
| 3.25 | 130 | 518 | NA |
| 3.5 | 107 | 426 | NA |
| 3.75 | 88 | 349 | NA |
| 4 | 72 | 287 | 1361 |
| 4.25 | 59 | 236 | 1135 |
| 4.5 | 48 | 193 | 947 |
| 4.75 | 39 | 159 | 790 |
| 5 | NA | 130 | 659 |
| 5.25 | NA | 107 | 549 |
| 5.5 | NA | 88 | 458 |
| 5.75 | NA | 72 | 382 |
| 6 | NA | 59 | 319 |
| 6.25 | NA | NA | 266 |
| 6.5 | NA | NA | 222 |
| 6.75 | NA | NA | 185 |
| 7 | NA | NA | 154 |
| 7.25 | NA | NA | 129 |
| 7.5 | NA | NA | 107 |

TABLE 2 an example for DS optimal gain setting for (D1, D2) distance pair.

| | | DS Optimal Gain D2 (ft) | | | | |
|---|---|---|---|---|---|---|
| | | 0 | 250 | 500 | 750 | 1000 |
| D1 | 1000 | 16 | 17 | 18 | 20 | 21 |
| | 1250 | 18 | 19 | 20 | 22 | 23 |
| | 1500 | 20 | 21 | 22 | 24 | 25 |
| | 1750 | 27 | 28 | 29 | 30 | 32 |

TABLE 2-continued an example for DS optimal gain setting for (D1, D2) distance pair.

| | DS Optimal Gain D2 (ft) | | | | |
|---|---|---|---|---|---|
| | 0 | 250 | 500 | 750 | 1000 |
| 2000 | 34 | 35 | 36 | 37 | 38 |
| 2250 | 36 | 37 | 38 | 40 | 42 |

After resetting the line as per step 420, the amplifier may be configured with a set of gains (DS, US) in which the line may be activated as per step 430. If the state is ShowTime, the DS/US signal level may be measured as per step 460. If the measured DS/US signal level at the output of the amplifier is within a settable THRESHOLD, then D1/D2 may be deduced by performing a lookup to first offline table as per step 480, and the DS/US gain may be deduced by performing a lookup to second offline using D1 and D2 as per step 490. If the measured DS/US signal level at the output of the amplifier is not within a settable THRESHOLD, another set of DS/US gains may be chosen and the same procedure may begin again as per step 420.

One of the main challenges is to detect that the DSLAM is in Showtime. According to some embodiments, the indication of entry into ShowTime state may be derived from the channel management interface. According to some other embodiments where the channel management is not in use, a procedure may be used to derive such indication. Since the all the estimation process should be short, the ShowTime detection, which is part of the estimation process, should be as short as possible.

Figure 5:
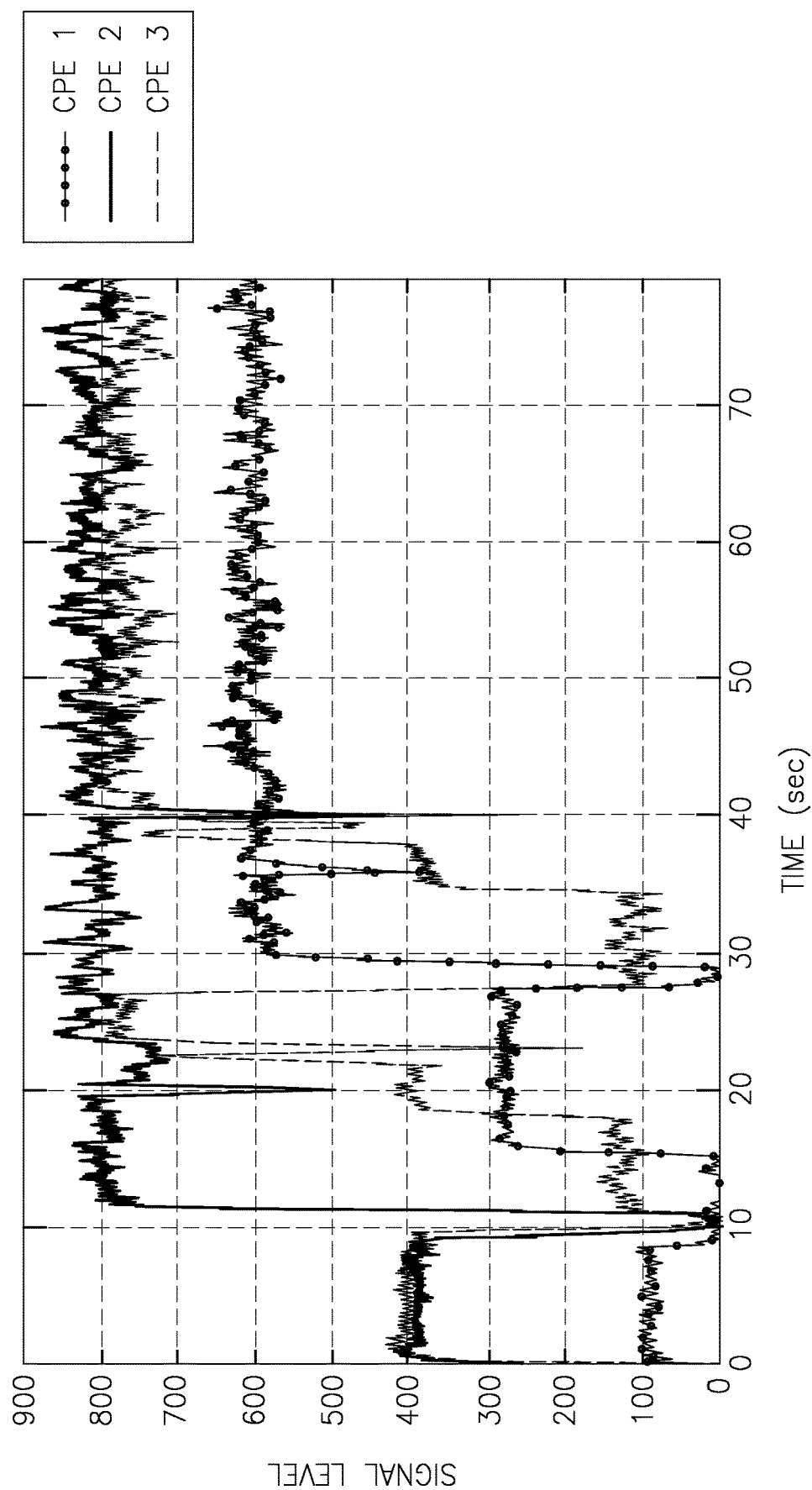
FIG. 5 is an example of a graph presenting signal level for different Very-high-bit-rate digital subscriber line (VDSL) CPEs.

Initialization duration and signal levels during the initialization process may depend on:
  DSLAM type
  CPE type (even when using DSLAM)
  Configuration (vectoring/non vectoring for example)
  Topology (total loop length between DSLAM and CPE, location of the amplifier)
  Interference environment
  Amplifier configuration FIG. 5 represents the signal level for different VDSL CPE, when activating with vectoring, same topology and using same amplifier configuration. CPE1 has a steady signal level of ~300 for 15 sec, but when looking at a broader prospective, this level is not a ShowTime level, but just a phase during the initialization, i.e., a steady signal level for 15 sec is not enough for ShowTime declaration.

One option for ShowTime detection may be to wait a few minutes after initialization starts and to assume that, after such long time, the line is active. There are two disadvantages for this method:
  Extended estimation time. Since ShowTime may be started earlier.
  Wrong signal level. Since line might not manage to finish initialization and the modem is not in ShowTime.

The proposed method is based on measuring the DS/US signals each T1 seconds during T2 seconds and searching steady signal level during this interval. In all the DMT modems, the steady signal level, which equal to the signal level during ShowTime, appears already during the final initialization stage. Therefore, the ShowTime detection can start already during initialization.

Figure 6:
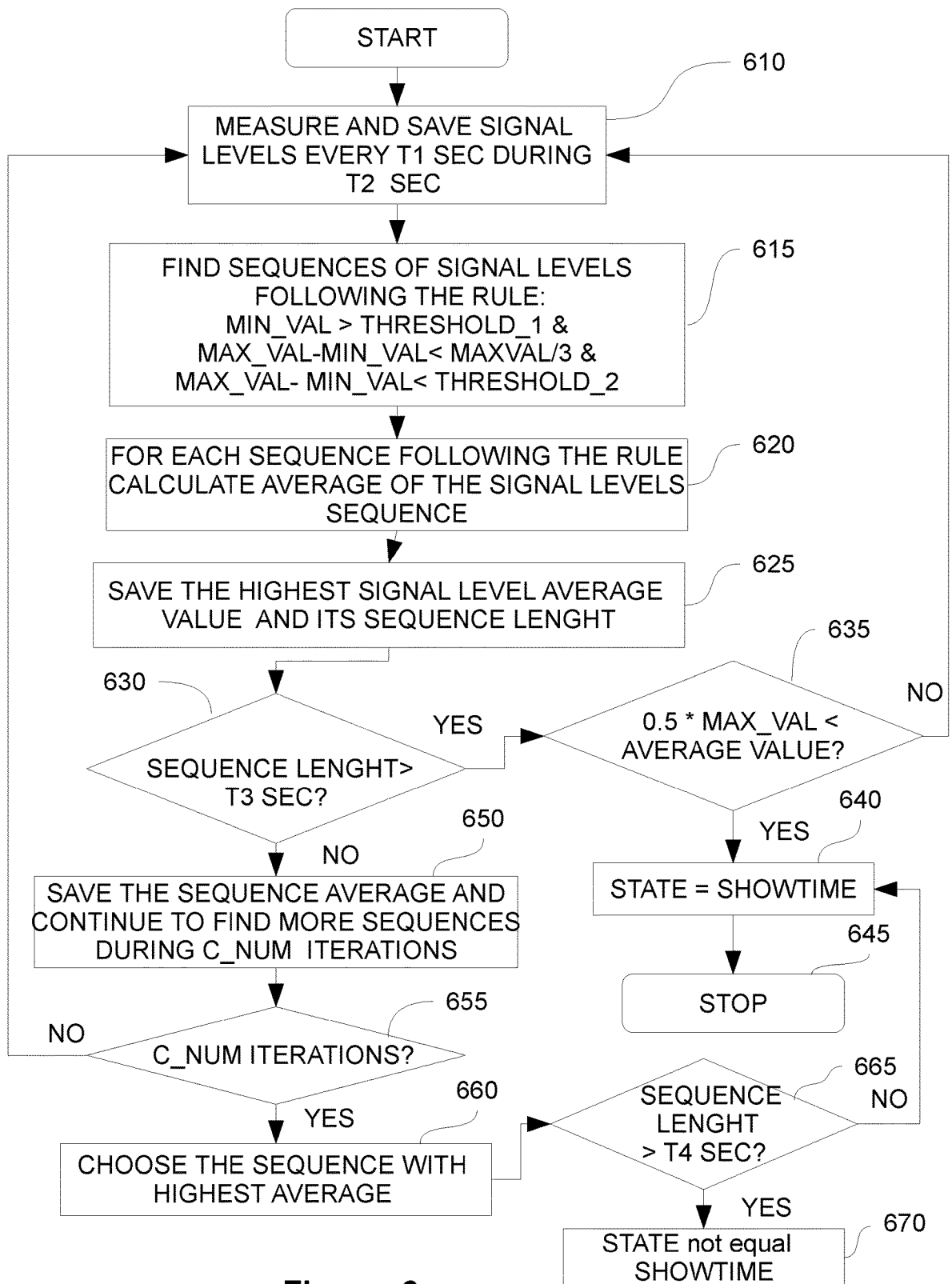
FIG. 6 is a block diagram to detect ShowTime, without channel management, according to an embodiment of the present invention.

FIG. 6 is a block diagram to detect ShowTime, without channel management, according to an embodiment of the present invention.

As per step 610, DS/US signal levels may be measured every T1 seconds during T2 seconds (T1, T2—settable parameters) and the measurements may be saved.

The purpose is to find sequences of signal level values which points to a steady state, in this case a sequence which follows the rule specified at step 615, and for each such sequence, the average value of the sequence may be calculated as per step 620. Once some sequences following this rule are found, the sequence with the highest average value and its sequence length may be saved as per step 625.

There are cases when the line goes into ShowTime, or finishes initialization stage and then drops, on such cases, the steady ShowTime signal level may be saved as per step 650, but such a level is executed for time which is shorter than required as shown at step 630, where the sequence length is less than T3 seconds, T3 being a settable parameter. On such cases, all C iterations (C—settable parameter) may be executed as per step 655, the highest steady value may be considered as per step 660, and in case the sequence length is of this sequence is greater than T4 seconds, T4 being a settable parameter, the ShowTime may be detected as per step 645.

In case the sequence length is greater than T3 seconds as per step 630 and if the average value of the sequence is less than 0.5 average value of the sequence as per step 635, the whole procedure may be started again. Otherwise, ShowTime may be detected as per step 645.

Figure 7:
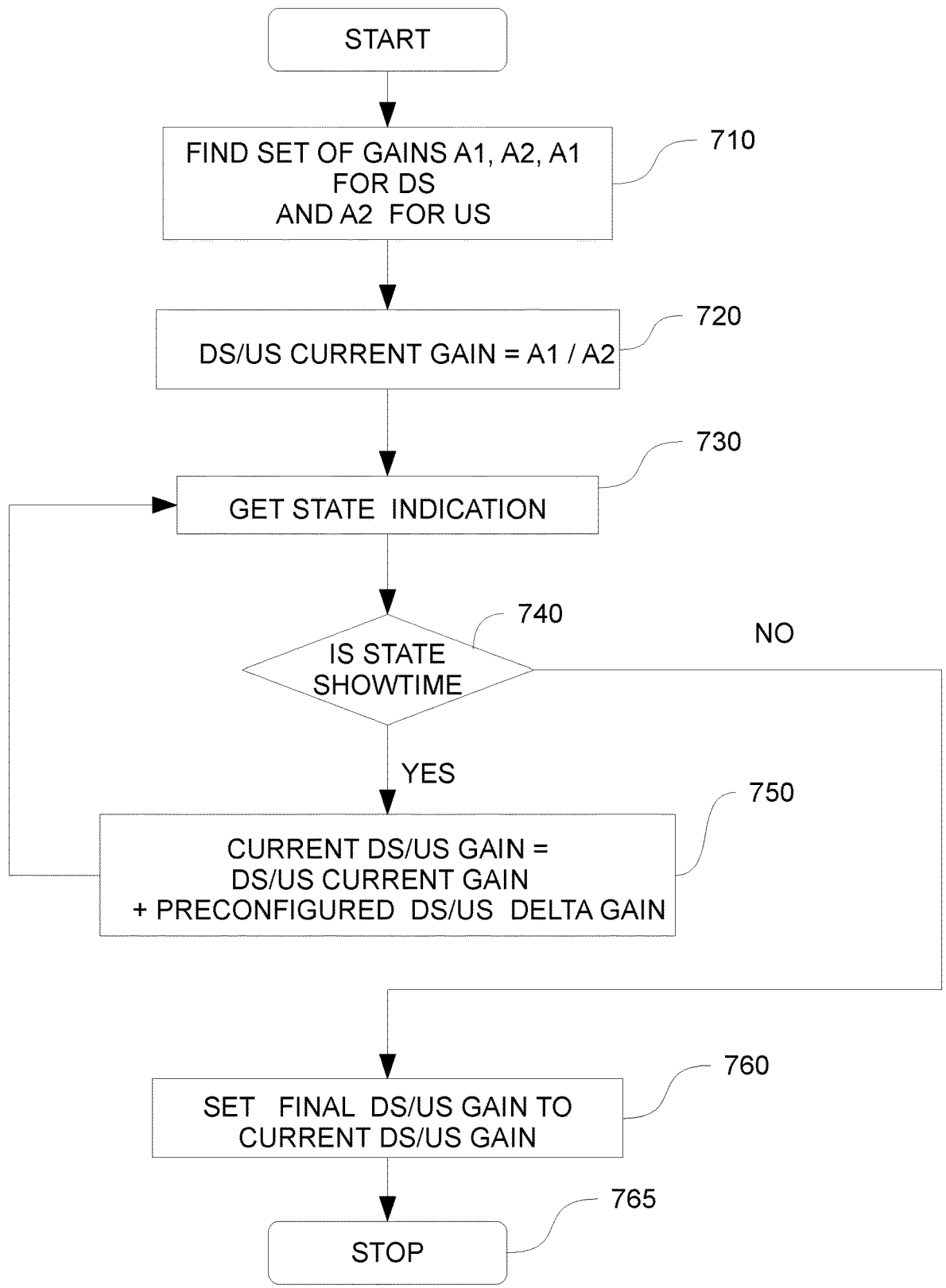
FIG. 7 is a block diagram of an additional embodiment of the gain estimation.

FIG. 7 is a block diagram of an additional embodiment of the gain estimation. In this embodiment, gain is modified while the modem is active (in showtime).

According to some embodiments, the indication of entry into ShowTime state may be derived from the channel management interface. According to some other embodiments wherein the channel management is not in use, the detection of the ShowTime may be done by signal processing, which is performed at the amplifier such as the procedure presented at FIG. 6.

At per steps 710 and 720, the amplifier may be configured with a set of gains A1 for DS gain, set as current DS gain. In case the indication of "ShowTime" is not "Showtime", then the final DS gain may be found, and it is equal to the DS current gain as per step 760.

In case the indication is in "Showtime" (meaning the activation succeeds), the current DS gain may be set to a new DS gain by increasing it by a settable DS gain as per step 750 and the procedure may start again from step 740.

The method, as disclosed in this embodiment, assumes that, when the line fails, it is an indication that the chosen gain is too high and causes saturation in the amplifier, and, therefore, a lower gain is needed. However, there may an option that the failure is a result of the DSLAM's failure to adjust to such major change in the loop state. In such case where the link failed once, according to an embodiment, the method may try an activation with the gain which resulted with the failure before. If the activation succeeds, then the method may continue with gain searching, otherwise (the activation failed for a second time at the same gain), the final DS gain is set to the highest DS gain set before the consecutive activation failures.

The whole process from step 710 may be performed to obtain the US gain, wherein A2 is set instead of A1, and using US delta gain instead of DS delta gain.

In this embodiment, the method may be optimized for finding the gain which is limited only by the amplifier capabilities.

According to some embodiments, wherein the spectral limitations are required, at step 750, distance estimation may be performed using first offline table and a maximum allowable value for the gain may be calculated using second offline table such that the spectral limitation is not violated.

While certain features of the invention have been illustrated, and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for estimating downstream gain and upstream gain of an amplifier at an intermediate location in a twisted pair line between a Digital Subscriber Line (DSL) Access Multiplexer (DSLAM) and a customer premises equipment for high data rate broadband operation, comprising:
   in an offline calibration process, obtaining a first offline table and a second offline table;
   an estimation process comprising:
      setting the downstream gain and the upstream gain, to a set of predefined gains in said twisted pair line when activated, first value of said set of predefined gains to the downstream gain and second value of said set of predefined gains to the upstream gain;
      obtaining an indication if said DSL Access Multiplexer state is ShowTime;
      measuring downstream signal level and upstream signal level at the output of said amplifier;
      estimating the distance from said amplifier to said customer premises equipment and distance from said amplifier to said DSL Access Multiplexer using said first offline table and said measured downstream signal level and upstream signal level; and
      obtaining said upstream gain and said downstream gain using said second offline table and said distances;
   wherein said first offline table specifies signal levels as a function of the distance between said amplifier to said customer premises equipment and the distance from said amplifier to said DSL Access Multiplexer, and
   wherein said second offline table specifies upstream gain and downstream gain as a function of the distance between said amplifier to said customer premises equipment and the distance from said amplifier to said DSL Access Multiplexer;
   wherein said first offline table specifies signal levels as a function of the distance between said amplifier to said customer premises equipment and the distance from said amplifier to said DSL Access Multiplexer, and
   wherein said second offline table specifies upstream gain and downstream gain as a function of the distance between said amplifier to said customer premises equipment and the distance from said amplifier to said DSL Access Multiplexer.

2. The method according to claim 1, wherein said obtaining indication is obtained by monitoring the state of said DSL Access Multiplexer.

3. The method according to claim 1, wherein said obtaining indication is derived from a procedure comprising:
   measuring downstream and upstream signal level every settable interval during a settable period; and
   searching for a steady signal level in said period, using a settable rule.

4. The method of claim 1, wherein said setting step is performed after restarting said line.

5. A method for downstream gain and upstream gain of an amplifier at an intermediate location in a twisted pair line between a Digital Subscriber Line (DSL) Access Multiplexer and a customer premises equipment for high data rate broadband operation, comprising:

setting the current downstream gain and the current upstream gain, to a set of predefined gains in which said twisted pair line may be activated, first value of said set of predefined gains to the downstream gain and second value of said set of predefined gains to the upstream gain;

obtaining an indication if said line state is ShowTime;

increasing said current downstream gain and said current upstream gain by downstream delta/upstream delta until said line state is not in ShowTime; and setting the current downstream and upstream gains according to highest downstream and upstream gain set before said failure to be in ShowTime.

6. The method according to claim 5, further comprising, wherein in case of several consecutive failures to reach ShowTime, setting the current downstream and upstream gains according to highest downstream and upstream gain set before said several consecutive failures.

7. The method according to claim 5, wherein maximal allowed gain in downstream and upstream are determined by said first and said second offline tables.

8. The method according to claim 5, wherein said obtaining indication is obtained by monitoring state of said DSL Access Multiplexer.

9. The method according to claim 5, wherein said obtaining indication is derived from a procedure comprising:

measuring downstream and upstream signal level every settable interval during a settable period; and searching for a steady signal level in said period, using a settable rule.

* * * * *